United States Patent
Lavi

(10) Patent No.: US 8,806,569 B2
(45) Date of Patent: Aug. 12, 2014

(54) METHOD AND SYSTEM FOR ANALYZING SECURITY RULESET BY GENERATING A LOGICALLY EQUIVALENT SECURITY RULE-SET

(75) Inventor: Yoni Lavi, Ra'anana (IL)

(73) Assignee: Tufin Software Technologies Ltd., Ramat Gan (IL)

( * ) Notice: Subject to any disclaimer, the term of this patent is extended or adjusted under 35 U.S.C. 154(b) by 0 days.

(21) Appl. No.: 13/367,795

(22) Filed: Feb. 7, 2012

(65) Prior Publication Data
US 2012/0204220 A1    Aug. 9, 2012

Related U.S. Application Data

(60) Provisional application No. 61/440,076, filed on Feb. 7, 2011.

(51) Int. Cl.
| | | |
|---|---|---|
| *G06F 21/00* | (2013.01) | |
| *H04L 29/06* | (2006.01) | |
| *G06F 21/60* | (2013.01) | |

(52) U.S. Cl.
CPC ......... *G06F 21/604* (2013.01); *H04L 63/0263* (2013.01)
USPC ..................................... 726/1; 726/3; 726/15

(58) Field of Classification Search
CPC ... H04L 63/101; H04W 84/045; H04W 88/08
USPC ............................................ 726/1–7, 11–15
See application file for complete search history.

(56) References Cited

U.S. PATENT DOCUMENTS

| | | | |
|---|---|---|---|
| 5,475,817 A * | 12/1995 | Waldo et al. ................. | 719/316 |
| 6,202,066 B1 | 3/2001 | Barkley et al. | |
| 6,564,037 B1 * | 5/2003 | Sweatman et al. ............ | 455/63.1 |
| 6,772,350 B1 | 8/2004 | Belani et al. | |
| 6,778,530 B1 * | 8/2004 | Greene .......................... | 370/389 |
| 7,100,195 B1 * | 8/2006 | Underwood ....................... | 726/2 |
| 7,137,104 B2 * | 11/2006 | Tip et al. ....................... | 717/126 |
| 7,185,192 B1 * | 2/2007 | Kahn ............................. | 713/155 |
| 7,219,234 B1 | 5/2007 | Ashland et al. | |
| 7,783,735 B1 * | 8/2010 | Sebes et al. .................... | 709/223 |
| 8,065,712 B1 * | 11/2011 | Cheng et al. ...................... | 726/1 |
| 8,380,981 B2 * | 2/2013 | Beckwith et al. ............. | 713/156 |
| 2003/0023587 A1 | 1/2003 | Dennis et al. | |

(Continued)

FOREIGN PATENT DOCUMENTS

EP    1903464 A1    3/2008

OTHER PUBLICATIONS

Benson, Theophilus et al., "Mining Policies From Enterprise Network Configuration", IMC'09, Nov. 4-6, 2009, Chicago, Illinois, USA.

(Continued)

*Primary Examiner* — Haresh N Patel
(74) *Attorney, Agent, or Firm* — Browdy and Neimark, PLLC

(57) ABSTRACT

There are provided a rule-set analyzer and a method of analyzing an ordered security rule-set comprising a plurality of rules comprising $N \geq 1$ extrinsic rule-fields. The method comprised: upon specifying an extrinsic space constituted by atomic elements corresponding to the values characterizing an extrinsic rule-field, partitioning said specified extrinsic space into two or more equivalence classes, wherein each atomic element in said extrinsic space belongs to one and only one equivalence class; mapping said equivalence classes over the rule-set; and generating a logically equivalent security rule-set, wherein respective rules comprise $N-1$ extrinsic rule-fields.

8 Claims, 5 Drawing Sheets

(56) References Cited

U.S. PATENT DOCUMENTS

| | | |
|---|---|---|
| 2003/0078932 A1 | 4/2003 | Kaiserwerth et al. |
| 2003/0229623 A1 | 12/2003 | Chang et al. |
| 2004/0153941 A1* | 8/2004 | Muratani .................. 714/746 |
| 2004/0225893 A1 | 11/2004 | Ng |
| 2004/0267865 A1* | 12/2004 | Cuervo ..................... 709/200 |
| 2005/0132054 A1 | 6/2005 | Chang et al. |
| 2005/0289150 A1 | 12/2005 | Kudo |
| 2006/0230043 A1 | 10/2006 | Sumner-Moore |
| 2007/0118893 A1* | 5/2007 | Crawford ..................... 726/11 |
| 2008/0037539 A1* | 2/2008 | Paramaguru ................ 370/392 |
| 2008/0066151 A1* | 3/2008 | Thomsen et al. ............... 726/1 |
| 2008/0127327 A1* | 5/2008 | Carrasco ..................... 726/15 |
| 2008/0276311 A1* | 11/2008 | Kassovic ..................... 726/11 |
| 2008/0289000 A1* | 11/2008 | Young et al. ................... 726/1 |
| 2009/0028047 A1* | 1/2009 | Schmidt et al. ............. 370/235 |
| 2009/0138938 A1* | 5/2009 | Harrison et al. ................ 726/1 |
| 2009/0147307 A1* | 6/2009 | Dietrich et al. ............. 358/1.15 |
| 2009/0183228 A1* | 7/2009 | Dasch et al. ..................... 726/1 |
| 2009/0287933 A1* | 11/2009 | Beckwith et al. ............. 713/176 |
| 2010/0011433 A1* | 1/2010 | Harrison et al. ................ 726/12 |
| 2010/0125891 A1* | 5/2010 | Baskaran ......................... 726/1 |
| 2010/0161960 A1* | 6/2010 | Sadasivan ..................... 713/152 |
| 2010/0174686 A1* | 7/2010 | Acharya et al. ............... 707/690 |
| 2010/0186062 A1* | 7/2010 | Banti et al. ..................... 726/1 |
| 2010/0257576 A1* | 10/2010 | Valente et al. ................... 726/1 |
| 2010/0299741 A1* | 11/2010 | Harrison et al. ............... 726/12 |
| 2011/0060713 A1* | 3/2011 | Harrison et al. ............... 706/47 |
| 2011/0225646 A1* | 9/2011 | Crawford ..................... 726/11 |
| 2011/0258656 A1* | 10/2011 | Michel ............................ 725/27 |
| 2011/0282771 A1* | 11/2011 | Reich et al. ..................... 705/35 |
| 2012/0089745 A1* | 4/2012 | Turakhia ....................... 709/245 |
| 2012/0180104 A1* | 7/2012 | Gronich et al. ................. 726/1 |
| 2012/0192246 A1* | 7/2012 | Harrison ......................... 726/1 |
| 2013/0031619 A1* | 1/2013 | Waltermann et al. ............. 726/8 |

* cited by examiner

US 8,806,569 B2

METHOD AND SYSTEM FOR ANALYZING SECURITY RULESET BY GENERATING A LOGICALLY EQUIVALENT SECURITY RULE-SET

CROSS-REFERENCES TO RELATED APPLICATIONS

This application relates to and claims priority from U.S. Provisional Patent Application No. 61/440,076 filed on Feb. 7, 2011 and incorporated herein by reference in its entirety.

FIELD OF THE INVENTION

This invention generally relates to network security, and more particularly, to systems of analyzing a security rule-set and methods of operating thereof.

BACKGROUND OF THE INVENTION

Today, information security is one of the critical concerns in computer networks and services. Various methods have been developed for protection of various resources and services; usually these methods include implementation of one or more security policies, combinations and hierarchies thereof. A security policy typically includes control of inbound and outbound traffic related to certain resources. Such control can be enforced with the help of a security gateway. Functions of the security gateway can be implemented fully or partly at various network devices (e.g. switches, routers, firewalls, VPN devices, load balancers, combinations thereof, etc.) and/or fully or partly implemented in the platforms accommodating these certain resources.

In addition to controlling traffic in accordance with source, destination and/or services, the security gateways are now evolving into a new generation that adds to the security policy two new dimensions, users and applications. Alternatively, the security gateways can provide control of access to certain resources in accordance with user and/or application independently of control based on source, destination and/or services characteristics of the traffic.

The problem of user/application based control has been recognized in the Prior Art and various systems have been developed to provide a solution, for example:

U.S. Pat. No. 6,772,350 (Belani et al.) discloses a distributed access controller for controlling access to resources in a multi-domain distributed computing environment. The access controller is configured to receive a request from a user requesting performance of one or more operations on a particular resource. The access controller attempts to resolve the requested operations based on user hierarchy information and access list information for the particular resource. If all the operations in the user's request cannot be resolved based on the user hierarchy information and the access list information for the particular resource, the access controller then attempts to resolve the unresolved operations based on the particular user's user hierarchy information in combination with resource hierarchy information, and access list information for the resources in the resource hierarchy information. In alternate embodiments, the access controller attempts to resolve the requested operations based on the resource hierarchy information and access list information for the resources in the resource hierarchy information. If all the operations in the user's request cannot be resolved based on the resource hierarchy information and the access list information for the resources in the resource hierarchy information, the access controller then attempts resolve the unresolved operations based on the resource hierarchy information in combination with the particular user's user hierarchy information, and the access list information for the resources in the resource hierarchy information.

US Patent Application No. 2005/132054 (Chang et al.) discloses methods, systems, and media for determining access rights to a resource managed by an application. One embodiment includes receiving a request by the application, wherein the request comprises an action a user seeks to perform on the resource, and locating, based on the request, the resource in both a containment relationship graph and in a structure having groupings of resources, wherein the groupings comprise a grouping having the resource. Further, the embodiment includes traversing a vertex of the containment relationship graph, wherein the vertex comprises a generational resource of the resource, and reading an authorization table associated with a grouping having the generational resource in the groupings. Further still, the embodiment includes determining whether to grant the access rights for performing the action on the resource.

U.S. Pat. No. 7,219,234 (Ashland et al.) discloses a system and method for managing system-level privileges and for granting access rights to system resources within a data processing system. System-level privileges are assigned directly to individual users. In contrast, access rights are assigned to individual users and/or to groups of users using data constructs known as Access Control Records (ACRs). Each ACR associates one or more user groups and/or one or more individual users with a set of access rights. A system resource is then associated with an ACR. The users identified within the associated ACR are thereby granted access to the object using the access rights specified by the ACR. An ACR may define multiple sets of access rights, with each set of access rights being associated with one or more user groups and/or one or more individual users.

SUMMARY OF THE INVENTION

In accordance with certain aspects of the currently presented subject matter, there is provided a method of analyzing an ordered security rule-set comprising a plurality of rules comprising $N \geq 1$ extrinsic rule-fields. The method comprised: upon specifying an extrinsic space constituted by atomic elements corresponding to the values characterizing an extrinsic rule-field, partitioning said specified extrinsic space into two or more equivalence classes, wherein each atomic element in said extrinsic space belongs to one and only one equivalence class; mapping said equivalence classes over the rule-set; and generating a logically equivalent security rule-set, wherein respective rules comprise $N-1$ extrinsic rule-fields.

When the extrinsic rule-field is a non-numeric rule-field (e.g. user, application, etc.), the method further comprises assigning a unique ID to each atomic element in the specified extrinsic space prior to partitioning the space into equivalence classes.

Partitioning into equivalence classes can be provided by mapping each atomic element in the specified extrinsic space to the rules it appears in, wherein each equivalence class is constituted by one or more atomic elements of said extrinsic space that appear in the same rules exactly. Alternatively or additionally, when the rule-set is associated with one or more data structures specifying groups of values characterizing said extrinsic rule-field, partitioning into equivalence classes can be provided by mapping each atomic element of said extrinsic space over all groups comprised in said at least one data structure, wherein each equivalence class is constituted by one or more atomic elements of said extrinsic space that appear in the same groups exactly.

The method can further comprise: responsive to a request related to conditions specified in the rule-set with regard to a given group specified in said one or more data structures, identifying equivalence classes corresponding to the given group; and analyzing the conditions specified in the logically equivalent rule-set for each of the identified equivalence classes.

Alternatively or additionally, the method can further comprise: responsive to a request related to conditions specified in the rule-set with regard to a given group non-specified in said one or more data structures, providing a new partitioning into equivalence classes by mapping each atomic element of said extrinsic space over all groups comprised in said at least one data structure and over said given group; generating a new logically equivalent security rule-set; identifying equivalence classes corresponding to the given group; and analyzing the conditions specified in the new logically equivalent rule-set for each of the identified equivalence classes.

In accordance with other aspects of the currently presented subject matter, there is provided a rule-set analyzer operable to analyze an ordered security rule-set comprising a plurality of rules comprising N≥1 extrinsic rule-fields. The rule-set analyzer comprises: a rule interface operable to obtain data specifying an extrinsic space constituted by atomic elements corresponding to the values characterizing an extrinsic rule-field; a processor operatively connected to the rule interface and operable to partition said specified extrinsic space into two or more equivalence classes, wherein each atomic element in said extrinsic space belongs to one and only one equivalence class; to map said equivalence classes over the rule-set; and to generate a logically equivalent security rule-set, wherein respective rules comprise N−1 extrinsic rule-fields.

When the extrinsic rule-field is a non-numeric rule-field, the processor can be further operable to assign a unique ID to each atomic element in the specified extrinsic space prior to partitioning the space into equivalence classes.

The processor can be operable to provide partitioning into equivalence classes by mapping each atomic element in the specified extrinsic space to the rules it appears in, and wherein each equivalence class is constituted by one or more atomic elements of said extrinsic space that appear in the same rules exactly.

The rule-set analyzer can further comprise a group interface operatively coupled to the processor and operable to obtain data specifying groups of values characterizing said extrinsic rule-field. The processor can be operable to provide partitioning into equivalence classes by mapping each atomic element of said extrinsic space over all groups comprised in said at least one data structure, and wherein each equivalence class is constituted by one or more atomic elements of said extrinsic space that appear in the same groups exactly.

The processor can be further operable, responsive to a request related to conditions specified in the rule-set with regard to a given group, to identify equivalence classes corresponding to the given group, and to analyze the conditions specified in the logically equivalent rule-set for each of the identified equivalence classes. Alternatively or additionally, the processor is further operable, responsive to a request related to conditions specified in the rule-set with regard to a given group non-specified in one or more data structures associated with the rule-set, to provide a new partitioning into equivalence classes by mapping each atomic element of said extrinsic space over all groups comprised in said at least one data structure and over said given group, to generate a new logically equivalent security rule-set, to identify equivalence classes corresponding to the given group, and to analyze the conditions specified in the new logically equivalent rule-set for each of the identified equivalence classes.

BRIEF DESCRIPTION OF THE DRAWINGS

In order to understand the invention and to see how it can be carried out in practice, an embodiment will now be described, by way of non-limiting example only, with reference to the accompanying drawings, in which.

DETAILED DESCRIPTION OF EXEMPLARY EMBODIMENTS

Figure 1:
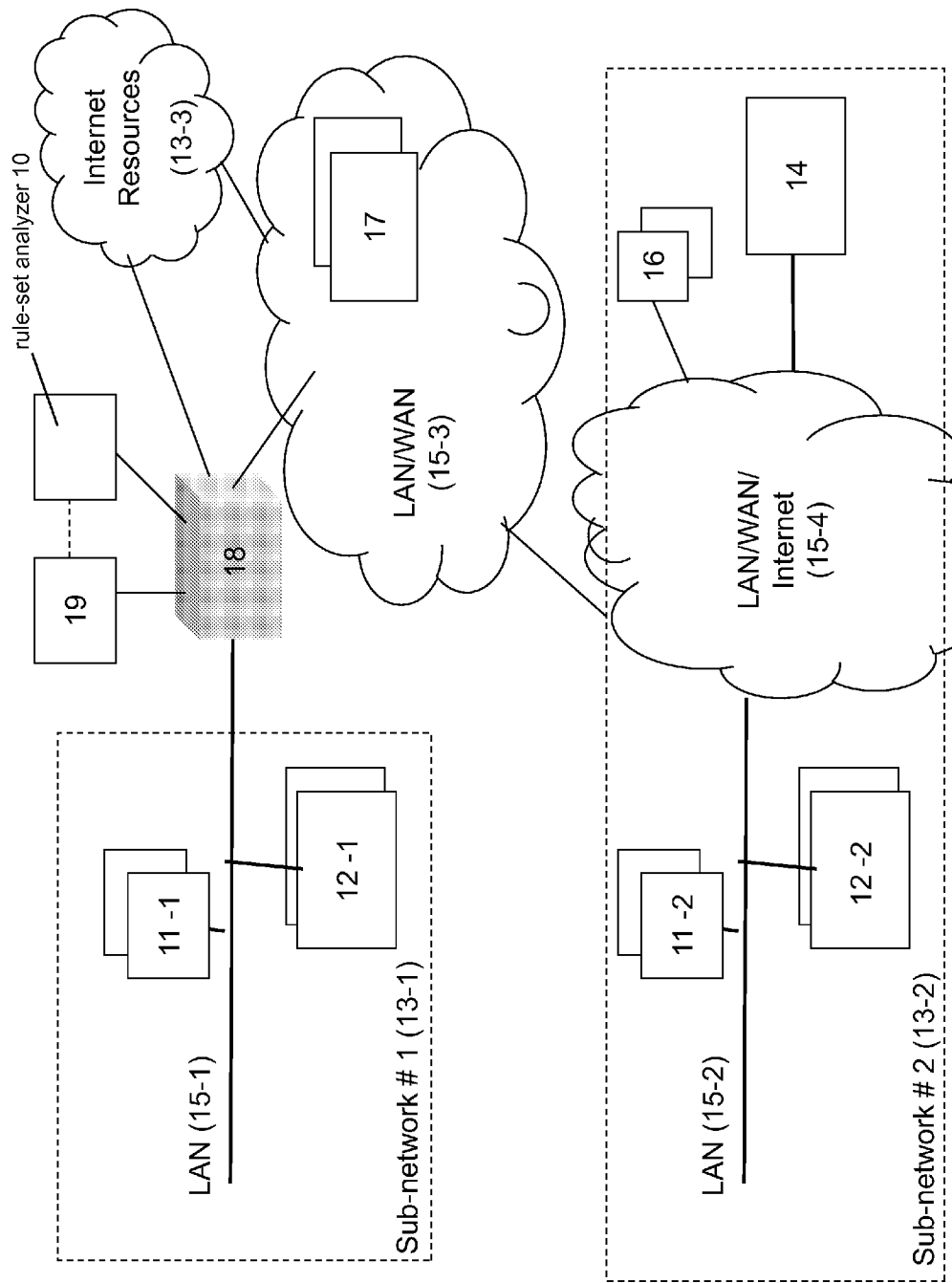
FIG. 1 illustrates a generalized network environment where the presently disclosed subject matter can be implemented.

In the following detailed description, numerous specific details are set forth in order to provide a thorough understanding of the invention. However, it will be to understood by those skilled in the art that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "analyzing", "specifying", "generating", "configuring", "searching", "mapping", or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities.

The operations in accordance with the teachings herein can be performed by a computer specially constructed for the desired purposes or by a general-purpose computer specially configured for the desired purpose by a computer program stored in a non-transitory computer readable storage medium.

Embodiments of the presently disclosed subject matter are not described with reference to any particular programming language. It will be appreciated that a variety of programming languages can be used to implement the teachings of the inventions as described herein.

The term "criterion" used in this patent specification should be expansively construed to include any compound criterion, including, for example, several criteria and/or their logical combinations.

The references cited in the background teach many principles of access control that are applicable to the present invention. Therefore the full contents of these publications are incorporated by reference herein where appropriate for appropriate teachings of additional or alternative details, features and/or technical background.

Bearing the above in mind, attention is drawn to FIG. 1 schematically illustrating an exemplary generalized data network implementing certain embodiments of the presently disclosed subject matter.

The illustrated data network comprises a plurality of intranet network resources (e.g. workstations 11-1, 11-2, and/or servers 12-1, 12-2, web-based application server 14, resources associated with mobile users 16, etc.) grouped in sub-networks 13-1 and 13-2. The sub-networks, as well as the resources within the sub-networks, can be operatively coupled via one or more local (15-1, 15-2) or wide area (15-3, 15-4) communication networks (including Internet) or combinations thereof. The communication network comprises one or more communication devices 17 (e.g. switches, routers, bridges, etc.) facilitating data transfer and can be private, public or combined. One or more communication networks (typically, private communication networks) can constitute a part of the intranet. The intranet resources (including client based resources, web-based resources, etc.) are predefined as belonging to the intranet. The intranet resources can be grouped in two or more logical groups (sub-networks) in accordance with different criterion. For example, the grouping can be provided in accordance with network architecture (e.g. resources connected by certain LAN) and/or business structure (e.g. resources related to a certain business unit) and/or business function (e.g. resources related to a certain application/business task) and/or level of user's trust and/or level of classified information, etc.

The data network can include also resources, other than intranet, by way of non-limiting example, Internet resources (other than web-based intranet resources); these resources can be grouped, for example, in one or more sub-networks 13-3.

A security gateway 18 is operatively coupled to the sub-network 13-1 and controls inbound and outbound traffic related to the sub-network and resources thereof.

Similarly, the security gateway 18 or other (not shown) security gateway(s) can control inbound and outbound traffic related to sub-network 13-2 and/or parts thereof (e.g. to a certain server and/or application running on the server). The security gateway can comprise, for example, one or more firewalls or routers with respective load balancers, intrusion detection/prevention systems, VPN devices and/or other equipment facilitating network and/or application security.

The security gateways operate in accordance with one or more rules controlling, at least, inbound and/or outbound traffic with regard to respective resources. These rules (including combinations and/or hierarchies thereof) are referred to hereinafter as a rule-set or rule base. A single rule typically includes several fields (e.g. source (IP address and/or port), destination (IP address and/or port), service type, user, application, etc.), and an action which shall be drawn from the rule when a certain condition with regard to the field values is satisfied. The fields included in such condition(s) are referred to hereinafter as "fields engaged in the rules". A field can be characterized by a specified set of values (e.g. a certain IP address, a certain range of TCP ports, a certain range of IP addresses in a LAN defined by a mask, any port, etc.). The action in the rule can specify accepting or denying the respective traffic, authentication, encryption, etc.

The rules are organized in a security rule-set corresponding to a specified security policy. Typically, the security rule-set is configured as an ordered list of rules that is processed from the top to the bottom in sequential order. The rules can be organized based on "first-match-wins" principle in which the first rule that matches a given IP packet will determine that packet's fate.

In addition to controlling traffic in accordance with source, destination and/or services, the security gateway can control traffic in accordance with users, applications and/or other additional fields specified in the rules. Alternatively, the security gateway can provide control of access to certain resources in accordance with, for example, user and/or application independently of control based on source, destination and/or services characteristics of the traffic.

Field values can be combined in groups and the rules in the rule-set can be specified with regard to the group. Accordingly, the security rule-set can be associated with one or more data structures accommodating definition of groups (e.g., user groups, service groups etc.). Such group-related associated data structures can be configured as a part of the security rule-set or can be implemented as external to the rule-set data structures (e.g. LDAP list, organization structure, etc.).

The security gateway 18 is operatively connected to a security management block 19. The security management block can be fully or partly integrated with the security gateway or can be implemented in one or more stand-alone servers or integrated with other network resources. The functions of the security management block can include providing a backend for the policy editor GUI, monitoring the operation of the security gateway, storing the rule-set database and associated data structures, reporting, etc. In certain embodiments, the rule-set database and/or associated data structures can be accommodated in the security gateway and/or the management block.

In accordance with certain embodiments of the presently disclosed subject matter, the security gateway 18 and/or the security management block 19 are operatively connected to a rule—set analyzer 10 operable to provide the rule-set auditing as further detailed with reference to FIGS. 2-3. The rule—set analyzer can be fully or partly integrated with the security gateway and/or the security management block, or can be implemented in one or more stand-alone servers, or fully or partly integrated with other devices (including sub-network resources, communication devices, security devices, etc.). Additionally or alternatively, the rule-set analyzer can provide the required rule-set auditing off-line.

Note that the invention is not bound by the specific architecture described with reference to FIG. 1. Those versed in the art will readily appreciate that the invention is, likewise, applicable to any network architecture facilitating access control to data network resources in accordance with an ordered "first-match-win" based rule-set installed at any suitable security gateway capable of controlling the respective traffic. The security gateway may be a standalone network entity, or integrated, fully or partly, with other network entities, including platforms accommodating the protected resources.

One of the common tasks in IT security management is auditing a security rule-set in order to assess how the security rule-set controls access to the resources. For example:

Does the security rule-set block certain risky traffic?
Does the security rule-set allow certain traffic that is needed for business?

By way of non-limiting example, the access control analyses can be provided with the help of network scanning including attempting connection to certain IP addresses and ports that are behind a security gateway with further reporting and analyzing the results.

A different approach is analytical and includes analyzing the security rule-set and determining (without actually sending the packets through the firewall) what decisions the security gateway would make for the traffic in question.

For example, if one wants to determine if the firewall permits connections from IP1 to IP2, one can traverse the rules, top-down, find the 1st rule with IP1 in source and IP2 in destination, and determine the answer according to the action that is defined in that rule.

Such a naïve algorithm would probably be impractical for larger data sets. For example, to analyze connections from 10.0.0.0/8 to 192.168.0.0/16 one would need to analyze 2^(24+16) combinations.

Certain solutions have been developed to optimize the analytical approach for a large number of combinations. Non-limiting examples of such analyses are disclosed in copending U.S. application Ser. No. 12/885,929 filed Sep. 20, 2010, now U.S. Pat. No. 8,468,113, assigned to the assignee of the present application and incorporated herewith by reference in its entirety.

In certain cases, analyzing the rule-set can be optimized by reducing the number of combinations that needs to be calculated. The optimization is based on grouping of values in a certain rule-field so that analysis can be performed once per group rather multiple times for each discrete value.

Some rule-fields are characterized by a set of values which can be naturally organized in consistent groups, i.e. groups constituted by group members which are all consistently treated by the rule-set. Source and destination fields, for example, contain IP addresses which can be naturally (intrinsically) grouped into subnets, wherein all IP addresses within a given subnet are consistently treated by respective rule-set. Analyzing source and destination fields for large data sets can be greatly optimized by performing the analysis per subnet rather than per IP.

Other values however, are not suitable for intrinsic grouping in consistent groups. Such values are referred to hereinafter as extrinsic values and fields characterized by extrinsic values are referred to hereinafter as extrinsic fields. Extrinsic values can characterize non-numerical fields (e.g. users, applications, services, etc.) and/or numerical fields (e.g. source and destination in case of other than sub-net grouping).

Table 1 below illustrates non-limiting example of a rule that comprises user and application fields in addition to such traditional fields as source, destination and port (service). The exemplified rule specifies that Reuven is allowed to access Facebook® from the LAN.

TABLE 1

| Rule Number | User | Source | Destination | Service | Application | Action |
|---|---|---|---|---|---|---|
| 1 | Reuven | LAN | Internet | 80 | Facebook® | Accept |

Tables 2 and 3 illustrate a non-limiting example of a security rule-set. Table 2 illustrates an exemplified rule-set comprising a "user" field. The "user" field in some rules is specified on a group level, such groups further detailed at a username level in the data structure illustrated in Table 3.

TABLE 2

| Rule Number | User Group | Source | Destination | Service | Application | Action |
|---|---|---|---|---|---|---|
| 1 | QA | ... | ... | ... | ... | Drop |
| 2 | R&D | ... | ... | ... | ... | Accept |
| 3 | Any | ... | ... | ... | ... | Drop |

TABLE 3

| User Group | Group Members (users) |
|---|---|
| QA | Sarah |
| R&D | Sarah, John, Emily |
| Any | Ella, Diana, Emily, Sarah John |

A first attempt to group the user values may consist of using the user groups as specified in the data structure. However, members of such groups are not necessarily treated consistently by the rule-set. For example, the rule-set illustrated in Tables 2 and 3 applies different rules for the users in the R&D group (John, Sarah). John appears in rules 2 and 3 while Sarah appears in rules 1, 2 and 3. Moreover, the illustrated rule-set applied different actions to John and Sara, as action with regard to Sara is controlled by the $1^{st}$ rule in the ordered rule-set. Accordingly, the values characterizing user field are extrinsic as being non-suitable for intrinsic grouping into consistent groups.

In accordance with certain embodiments of the presently disclosed subject matter, there is provided a method of analyzing a security rule-set comprising rules with extrinsic fields. Extrinsic values specified in the rule-set constitute an extrinsic space corresponding to the field. The rule-set can be characterized by $N \geq 0$ extrinsic spaces, each corresponding to the respective extrinsic field.

Figure 2:
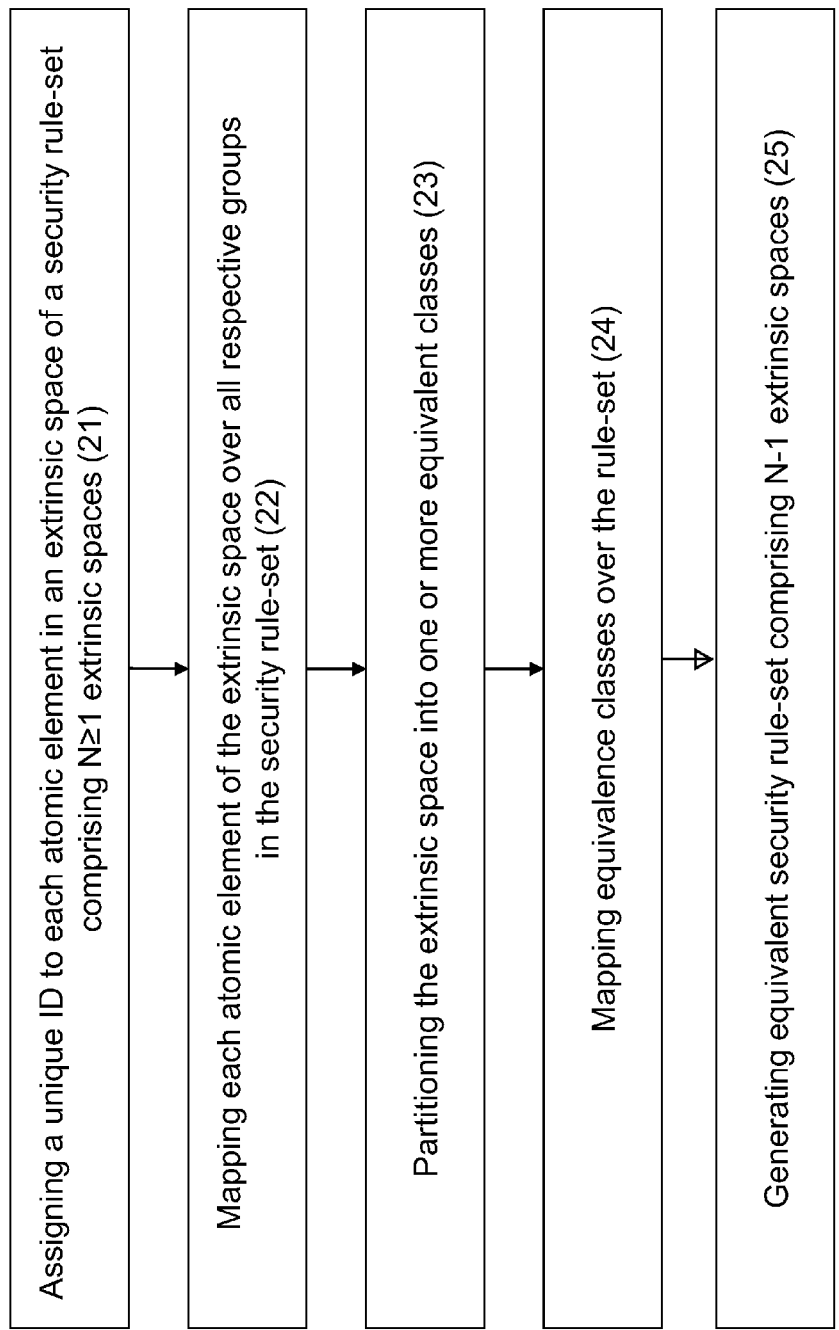
FIG. 2 illustrates a generalized flow diagram of analyzing a rule-set in accordance with certain embodiments of the presently disclosed subject matter.

A generalized flow diagram of analyzing a rule-set in accordance with certain embodiments of the presently disclosed subject matter is illustrated in FIG. 2.

For purpose of illustration only, the following description is provided for a "user" extrinsic space, constituted by the usernames specified in the rule-set. Those versed in the art will readily appreciate that, likewise, the disclosed subject matter can be applied to other fields specified in the security rule-set.

The analysis can be provided for an entire extrinsic space or only for specific extrinsic values selected in accordance with certain criterion. By way of non-limiting example, if users are authenticated against an external server (e.g. such as LDAP), then analysis can be provided for all usernames that are defined in that server. If the value 'Any User' is used in the rule-set, then the users that are not explicitly mentioned in the rules can also be included in the analyses.

In accordance with certain embodiments of the presently disclosed subject matter, the rule-set analyzer assigns (21) a unique ID to each atomic element in a given extrinsic space constituted by specified in the rule-set values of respective extrinsic field. The specified value is referred to as an "atomic element" if it cannot be broken down into simpler values. For example, usernames (namely John, Sarah, Ella, Diana, and Fred) are atomic elements in the "user" extrinsic space illustrated in Tables 2 and 3. The unique ID may be specified in any suitable form as, for example, the value itself (e.g. username), a serial number, etc. The atomic elements and groups thereof can be specified in a separate data structure associated with the rule-set or can be specified inside the rule-set. The operation (21) is not necessary if the extrinsic space is a numeric space (e.g. source or destination).

Each atomic element in the given extrinsic space is mapped (22) over all groups specified in one or more data structures associated with the security rule-set, thereby identifying all groups containing the respective atomic element.

The given extrinsic space is further partitioned into equivalence classes (23) such that each atomic element belongs to one and only one equivalence class.

The equivalence classes can be generated by mapping the atomic elements to specified groups of atomic elements. A group of atomic elements in a given extrinsic space that appear in the exactly same set of groups is referred to hereinafter as a "group-based equivalence class".

For example, in the user space the equivalence function is defined such that two users are equivalent if and only if they belong to the same set of groups exactly:

F(user)=Containing Groups(user)

F(user1)=F(user2)→user1~user2

Table 4 illustrates group-based equivalence classes generated for the non-limiting example of the security rule-set illustrated in Tables 2 and 3.

TABLE 4

| Equivalence Class | Groups | Members |
| --- | --- | --- |
| 1 | R&D, Any | Emily, John |
| 2 | QA, R&D, Any | Sarah |
| 3 | Any | Ella, Diana |

Note that users appearing directly in the rule base (not through a group) and the value 'Any' are considered as groups.

In contrast to the groups originally defined in the security policy when the rule-set may apply different rules for the users of the same group, the exact same rules apply for all users in a group-based equivalence class.

It should also be noted that the original groups and every logical combination of them (union, intersection, complement, etc.) can be represented as a union of the group-based equivalence classes. This enables analysis for any of the original groups, and combination thereof, using the constructed group-based equivalence classes.

For example, R&D can be represented by the union of equivalence classes 1 and 2. Users in R&D excluding QA can be represented by the equivalence class 1.

Figure 4:
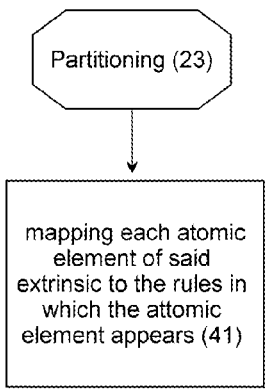
FIG. 4 illustrates a generalized functional block diagram of the method of partitioning in accordance with one embodiment of the presently disclosed subject matter.

Alternatively, as illustrated in FIG. 4, the equivalence classes can be generated by mapping the atomic elements to rules in which they appear (41). A group of atomic elements in a given extrinsic space that appear exactly in the same set of rules is referred to hereinafter as a "rule-based equivalence class".

Table 5 illustrates rule-based equivalence classes generated for the non-limiting example of the security rule-set illustrated in Tables 2 and 3.

TABLE 5

| Equivalence Class | Rule Number | Members |
| --- | --- | --- |
| 1 | 2, 3 | John, Emily |
| 2 | 1, 2, 3 | Sarah |
| 3 | 3 | Ella, Diana |

Upon generating the equivalence classes, the rule-set analyzer further provides mapping (24) between the equivalence classes and the rules in the rule-set, thereby determining which equivalence classes are relevant per rule; and generating (25) a rule-set in accordance with the equivalence classes.

The generated security rule-set comprises N–1 extrinsic spaces. Optionally, for further optimization of the rule-set, the operations 21-25 can be recursively applied to other extrinsic fields.

Table 6 illustrates a generated rule-set corresponding to the non-limiting example illustrated in Tables 2-4 (group-based equivalence classes).

TABLE 6

| Number | Equivalence class | Source | Destination | Service | Application | Action |
| --- | --- | --- | --- | --- | --- | --- |
| 1 | 2 | ... | ... | ... | ... | Drop |
| 2 | 1, 2 | ... | ... | ... | ... | Accept |
| 3 | 1, 2, 3 | ... | ... | ... | ... | Drop |

The illustrated generated rule-set is logically equivalent to the original rule-set, however, unlike the original rule-set, all members of each equivalence class are either fully included in a rule or not. There are no rules that contain a partial subset of a certain equivalence class in contrast to the original rule-set, where, for example, R&D member, Sarah, appears in rule 1, while the other two R&D members, John and Emily do not.

Thus, the disclosed technique enables calculating combinations per equivalence class instead of calculating them for each user. For example, rather than calculating the combinations for Emily and John separately, the calculation can be provided for the group-based equivalence class number 1 which consists of Emily and John and behaves consistently for them.

The conditions of the original groups can be also calculated by combining equivalence classes. For example, R&D group is combination of group-based equivalence classes 1 and 2.

Likewise, Table 7 illustrates generated rule-set corresponding to the non-limiting example illustrated in Tables 2-3, 5 (rule-based equivalence classes).

TABLE 7

| Number | Equivalence class | Source | Destination | Service | Application | Action |
| --- | --- | --- | --- | --- | --- | --- |
| 1 | 2 | ... | ... | ... | ... | Drop |
| 2 | 1, 2 | ... | ... | ... | ... | Accept |
| 3 | 1, 2, 3 | ... | ... | ... | ... | Drop |

Figure 5:
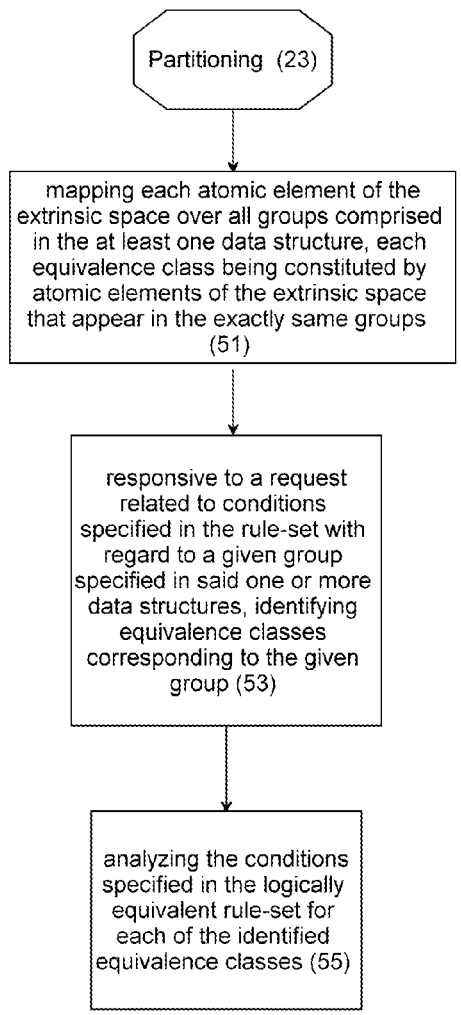
FIG. 5 illustrates a generalized functional block diagram of the method of partitioning in accordance with one embodiment of the presently disclosed subject matter.

Alternatively or additionally as shown in FIG. 5, mapping (24) between the equivalence classes and the rules in the rule-set can be used for optimized audit of the initial rule-set. For example, when answering questions related to a group in a given extrinsic field (e.g. "Is R&D allowed access to Facebook®?"), the rule-set analyzer can identify equivalence classes corresponding to the group (53) and analyze the conditions in the other N–1 fields for each of the respective equivalence classes (55).

Figure 6:
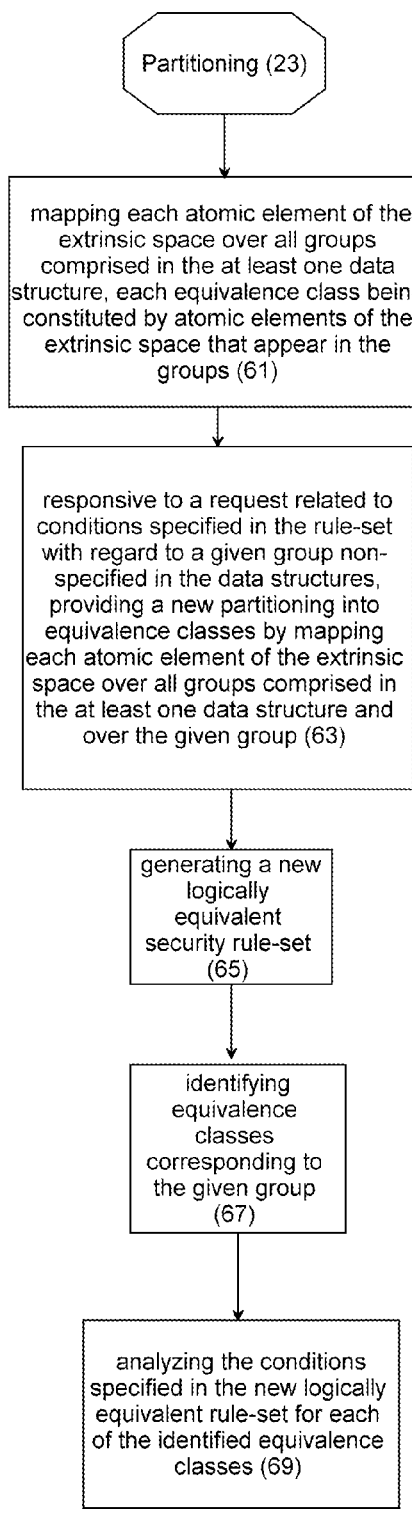
FIG. 6 illustrates a generalized functional block diagram of the method of partitioning in accordance with one embodiment of the presently disclosed subject matter.

Likewise, as illustrated in FIG. 6, the analyses can be provided for a group which is not specified in the respective data structure (61) (e.g. a new group not specified in Table 3 and consisting of Sarah and Diana). The rule-set analyzer adds the required group to the respective data structure and generates the equivalence classes in accordance with the amended data structure. In particular, responsive to a request related to conditions specified in the rule-set with regard to a given group non-specified in the data structures, a new partitioning into equivalence classes is provided by mapping each atomic element of the extrinsic space over all groups comprised in the data structure and over the given group (63). A new logically equivalent security rule-set is generated (65). Equivalence classes are identified corresponding to the given group (67) and the conditions specified in the new logically equivalent rule-set are analyzed for each of the identified equivalence classes (69). Table 8 illustrates the amended data structure and Table 9 illustrates the respectively generated equivalence classes.

TABLE 8

| Group | Group Members (users) |
|---|---|
| QA | Sarah |
| R&D | Sarah, John, Emily |
| Any | Ella, Diana, Emily, Sarah John |
| Group1 | Sarah, Diana |

TABLE 9

| Equivalence Class | Groups | Members |
|---|---|---|
| 1 | R&D, Any | Emily, John |
| 2 | QA, R&D, Any, New Group | Sarah |
| 3 | Any | Ella |
| 4 | Any, New Group | Diana |

Figure 3:
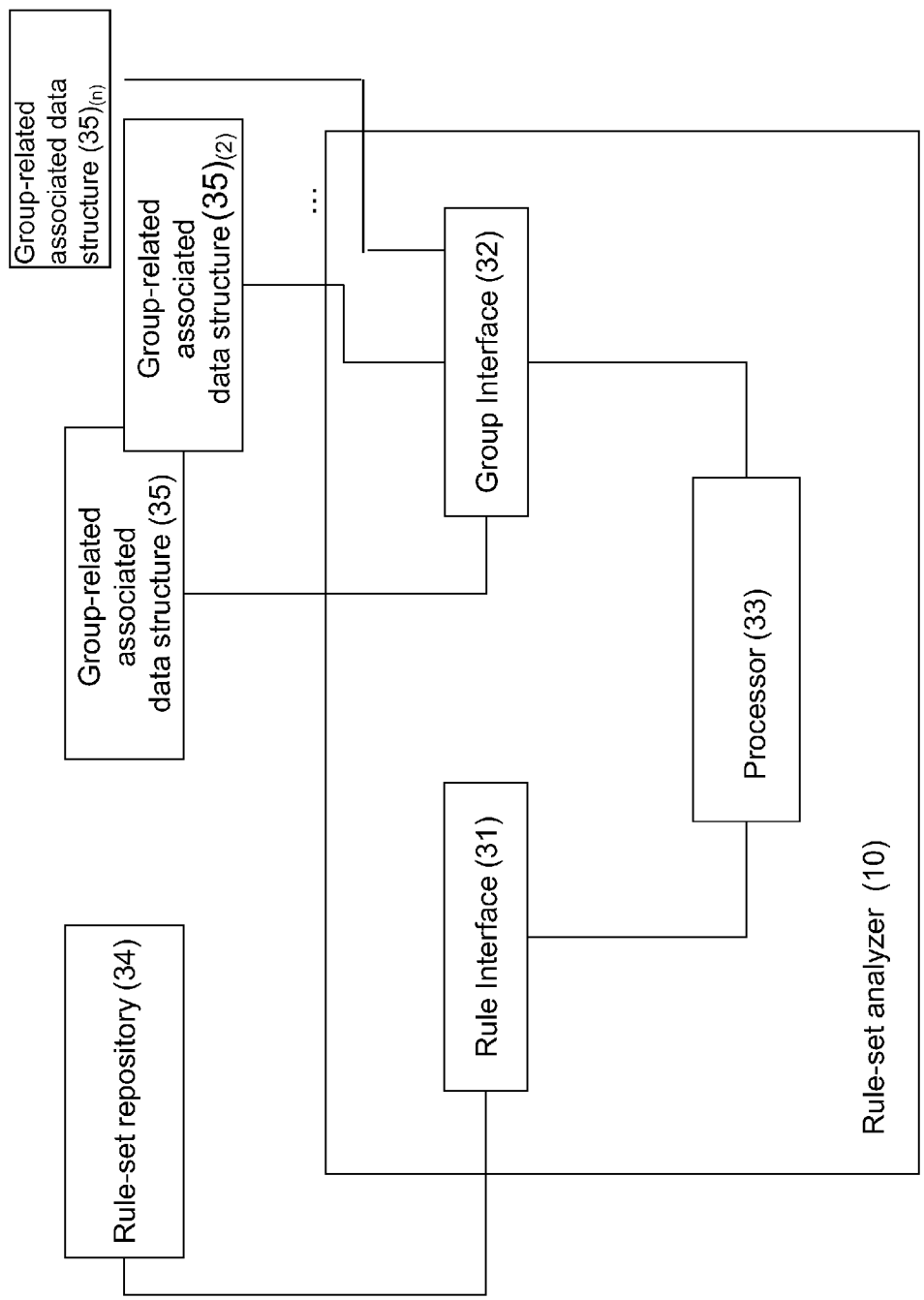
FIG. 3 illustrates a generalized functional block diagram of a rule-set analyzer in accordance with certain embodiments of the presently disclosed subject matter.

Referring to FIG. 3, there is illustrated a generalized block-diagram of the rule-set analyzer in accordance with certain embodiments of the presently disclosed subject matter. The rule-set analyzer (10) can be implemented as a standalone platform or integrated, fully or partly, with other network resources (e.g. firewall or other security gateway, security management module, sniffer, switch, application servers, etc.). The rule-set analyzer comprises a processor (33) operatively coupled to a rule interface (31) and a group interface (32). The rule interface is configured to obtain rules from a rule-set repository (34) and to forward the rules and/or derivatives thereof to the processor. The group interface is configured to obtain specification of groups of values specified in the fields from one or more associated group-related data structures $(35_1)$, $(35_2)$, ... $(35_n)$. The processor 33 is configured to provide necessary processing of the obtained rules and group specifications, to generate a logically equivalent rule-set in accordance with operations detailed with reference to FIGS. 1-2, to analyze the generated rule-set and/or to forward, if necessary, the generated rule-set to the security gateway and/or for accommodation in one or more data repositories (not shown) operatively coupled to the processor.

Those skilled in the art will readily appreciate that the presently disclosed subject matter is not bound by the configuration of FIG. 3; equivalent and/or modified functionality can be consolidated or divided in another manner and can be implemented in software, firmware, hardware, or any appropriate combination thereof. Those skilled in the art will also readily appreciate that the data repositories can be consolidated or divided in other manner; some of these databases can be shared with other systems or be provided by other systems, including 3rd party equipment.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which can be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of analyzing an initial ordered security rule-set comprising a plurality of rules, each rule comprising N≥1 extrinsic fields, wherein the rule-set is associated with at least one data structure specifying groups of extrinsic values characterizing at least one extrinsic field, the method comprising:

upon specifying an extrinsic space constituted by atomic elements corresponding to extrinsic values characterizing an extrinsic field, partitioning said specified extrinsic space into two or more equivalence classes, wherein partitioning into equivalence classes is provided by mapping each atomic element of the extrinsic space over all groups of extrinsic values characterizing the at least one extrinsic field and comprised in the at least one data structure, and wherein each atomic element in said extrinsic space belongs to one and only one equivalence class and each equivalence class is constituted by one or more atomic elements of the extrinsic space that appear in same groups exactly;

mapping said equivalence classes over the rule-set;

using the results of mapping the equivalence classes over the rule-set for generating, by a processor, a logically equivalent security rule-set, wherein each of the respective rules in the generated rule-set comprises N−1 extrinsic fields;

responsive to a request related to conditions specified in the rule-set with regard to a given group non-specified in the at least one data structure, providing a new partitioning into equivalence classes by mapping each atomic element of the extrinsic space over all groups of extrinsic values characterizing the at least one extrinsic field and comprised in the at least one data structure and over the given group;

generating a new logically equivalent security rule-set;

identifying equivalence classes corresponding to the given group; and analyzing the conditions specified in the new logically equivalent rule-set for each of the identified equivalence classes.

2. The method of claim 1, wherein at least one extrinsic field is selected from a group comprising a user field and an application field.

3. The method of claim 1, wherein the extrinsic field is a non-numeric field, the method further comprising assigning a unique ID to each atomic element in the specified extrinsic space prior to partitioning the space into equivalence classes.

4. An analyzer configured to analyze an ordered security rule-set comprising a plurality of rules, each rule comprising N≥1 extrinsic fields, wherein the rule-set is associated with at least one data structure specifying groups of extrinsic values characterizing at least one extrinsic field, the analyzer comprising:

a first interface configured to obtain data specifying an extrinsic space constituted by atomic elements corresponding to extrinsic values characterizing the at least one extrinsic field;

a second interface configured to obtain data specifying the groups of extrinsic values characterizing the at least one extrinsic field;

a processor operatively connected to the first interface and the second interface and configured:

to partition the extrinsic space into two or more equivalence classes, wherein partitioning into equivalence classes is provided by mapping each atomic element of the extrinsic space over all groups of extrinsic values characterizing the at least one extrinsic field and comprised in the at least one data structure, and wherein each atomic element in the extrinsic space belongs to one and only one equivalence class and each equivalence class is constituted by one or more atomic elements of the extrinsic space that appear in same groups exactly;

to map the equivalence classes over the rule-set; and to generate a logically equivalent security rule-set, wherein each of respective rules in the generated rule-set comprises N−1 extrinsic rule-fields, responsive to a request related to conditions specified in the rule-set with regard to a given group non-specified in the at least one data structures associated with the rule-set, to provide a new partitioning into equivalence classes by mapping each atomic element of said extrinsic space over all groups of extrinsic values characterizing the at least one extrinsic field and comprised in the at least one data structure and over the given group;

to generate a new logically equivalent security rule-set;

to identify equivalence classes corresponding to the given group; and to analyze the conditions specified in the new logically equivalent rule-set for each of the identified equivalence classes.

5. The rule-set analyzer of claim 4, wherein at least one extrinsic field is selected from a group comprising a user field and an application field.

6. The rule-set analyzer of claim 4, wherein the extrinsic field is a non-numeric field, the processor further operated to assign a unique ID to each atomic element in the specified extrinsic space prior to partitioning the space into equivalence classes.

7. A non-transitory computer readable medium storing a computer readable program executable by a computer for causing the computer to perform a method of analyzing an ordered security rule-set comprising a plurality of rules, each rule comprising N≥1 extrinsic fields, wherein the rule-set is associated with at least one data structure specifying groups of extrinsic values characterizing at least one extrinsic field, the method comprising:

upon specifying an extrinsic space constituted by atomic elements corresponding to extrinsic values characterizing the at least one extrinsic field, partitioning said specified extrinsic space into two or more equivalence classes, wherein partitioning into equivalence classes is provided by mapping each atomic element of the extrinsic space over all groups of extrinsic values characterizing the at least one extrinsic field and comprised in the at least one data structure, and wherein each atomic element in said extrinsic space belongs to one and only one equivalence class and each equivalence class is constituted by one or more atomic elements of the extrinsic space that appear in same groups exactly;

mapping said equivalence classes over the rule-set;

using the results of mapping the equivalence classes over the rule-set for generating a logically equivalent security rule-set, wherein respective rules in the generated rule-set comprise N−1 extrinsic fields;

responsive to a request related to conditions specified in the rule-set with regard to a given group non-specified in the at least one data structure, providing a new partitioning into equivalence classes by mapping each atomic element of the extrinsic space over all groups of extrinsic values characterizing the at least one extrinsic field and comprised in the at least one data structure and over the given group;

generating a new logically equivalent security rule-set;

identifying equivalence classes corresponding to the given group; and analyzing the conditions specified in the new logically equivalent rule-set for each of the identified equivalence classes.

8. A computer program product comprising a non-transitory computer readable medium storing computer readable program code embodied therein for causing a computer to perform a method of analyzing an ordered security rule-set comprising a plurality of rules, each rule comprising N≥1 extrinsic fields, wherein the rule-set is associated with at least one data structure specifying groups of extrinsic values characterizing at least one extrinsic field, the computer program product comprising:

computer readable program code for causing the computer, upon specifying an extrinsic space constituted by atomic elements corresponding to extrinsic values characterizing the at least one extrinsic field, to partition said specified extrinsic space into two or more equivalence classes, wherein partitioning into equivalence classes is provided by mapping each atomic element of the extrinsic space over all groups of extrinsic values characterizing the at least one extrinsic field and comprised in the at least one data structure, and wherein each atomic element in said extrinsic space belongs to one and only one equivalence class and each equivalence class is constituted by one or more atomic elements of the extrinsic space that appear in same groups exactly;

computer readable program code for causing the computer to map said equivalence classes over the rule-set; and computer readable program code for causing the computer to generate a logically equivalent security rule-set, wherein respective rules in the generated rule-set comprise N−1 extrinsic fields; and computer readable program code for causing the computer, responsive to a request related to conditions specified in the rule-set with regard to a given group non-specified in the at least one data structure to provide a new partitioning into equivalence classes by mapping each atomic element of the extrinsic space over all groups of extrinsic values characterizing the at least one extrinsic field and comprised in the at least one data structure and over the given group;

computer readable program code for causing the computer to generate a new logically equivalent security rule-set;

computer readable program code for causing the computer to identify equivalence classes corresponding to the given group; and computer readable program code for causing the computer to analyze the conditions specified in the new logically equivalent rule-set for each of the identified equivalence classes.

* * * * *